(12) United States Patent
Chen et al.

(10) Patent No.: US 7,206,281 B2
(45) Date of Patent: Apr. 17, 2007

(54) CALCULATING PHYSICAL ROUTES IN A COMMUNICATION NETWORK

(75) Inventors: Wen Chen, San Jose, CA (US); Xin Li, Santa Clara, CA (US); Makarand S. Bhatambarekar, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 533 days.

(21) Appl. No.: 10/138,853

(22) Filed: May 3, 2002

(65) Prior Publication Data

US 2003/0206516 A1    Nov. 6, 2003

(51) Int. Cl.
*G01R 31/08* (2006.01)

(52) U.S. Cl. .................... 370/222; 370/238.1

(58) Field of Classification Search ........ 370/221–223, 370/238–238.1, 256; 379/112.05
See application file for complete search history.

(56) References Cited

U.S. PATENT DOCUMENTS

| | | | |
|---|---|---|---|
| 4,873,517 A * | 10/1989 | Baratz et al. ........... | 379/221.07 |
| 5,016,243 A * | 5/1991 | Fite, Jr. ................. | 370/218 |
| 5,117,422 A * | 5/1992 | Hauptschein et al. ....... | 370/255 |
| 5,412,376 A * | 5/1995 | Chujo et al. ............. | 370/397 |
| 5,467,345 A * | 11/1995 | Cutler et al. ............ | 370/229 |
| 5,515,367 A | 5/1996 | Cox, Jr. et al. | |
| 5,629,930 A * | 5/1997 | Beshai et al. ........... | 370/396 |
| 5,649,108 A | 7/1997 | Spiegel et al. | |
| 5,764,740 A * | 6/1998 | Holender ................ | 379/112.05 |
| 5,787,271 A | 7/1998 | Box et al. | |
| 5,838,924 A | 11/1998 | Anderson et al. | |
| 5,933,425 A | 8/1999 | Iwata | |
| 6,026,077 A * | 2/2000 | Iwata .................... | 370/225 |
| 6,069,894 A | 5/2000 | Holender et al. | |
| 6,163,527 A * | 12/2000 | Ester et al. ............. | 370/228 |
| 6,304,556 B1 * | 10/2001 | Haas .................... | 370/238 |
| 6,430,150 B1 * | 8/2002 | Azuma et al. ............ | 370/228 |
| 6,795,394 B1 * | 9/2004 | Swinkels et al. .......... | 390/222 |
| 2002/0024961 A1 * | 2/2002 | Sestito et al. ............ | 370/403 |
| 2002/0167898 A1 * | 11/2002 | Thang et al. ............ | 370/216 |

FOREIGN PATENT DOCUMENTS

WO    WO03/094537 A2    11/2003

OTHER PUBLICATIONS

International Search Report, dated Feb. 25, 2004 for PCT/US03/13864.
Notice Informing the Applicant of the Communicatio of the International Application to the Designated Offices.

* cited by examiner

*Primary Examiner*—Doris H. To
*Assistant Examiner*—Phuongchau Ba Nguyen
(74) *Attorney, Agent, or Firm*—Merek, Blackmon & Voorhees, LLC

(57) ABSTRACT

A system operating on a communication network for mapping service-level information comprising logical connections to physical-level information comprising working physical paths of the logical connections, where the physical-level information is obscured by activation of protect schemes within the communication network.

19 Claims, 17 Drawing Sheets

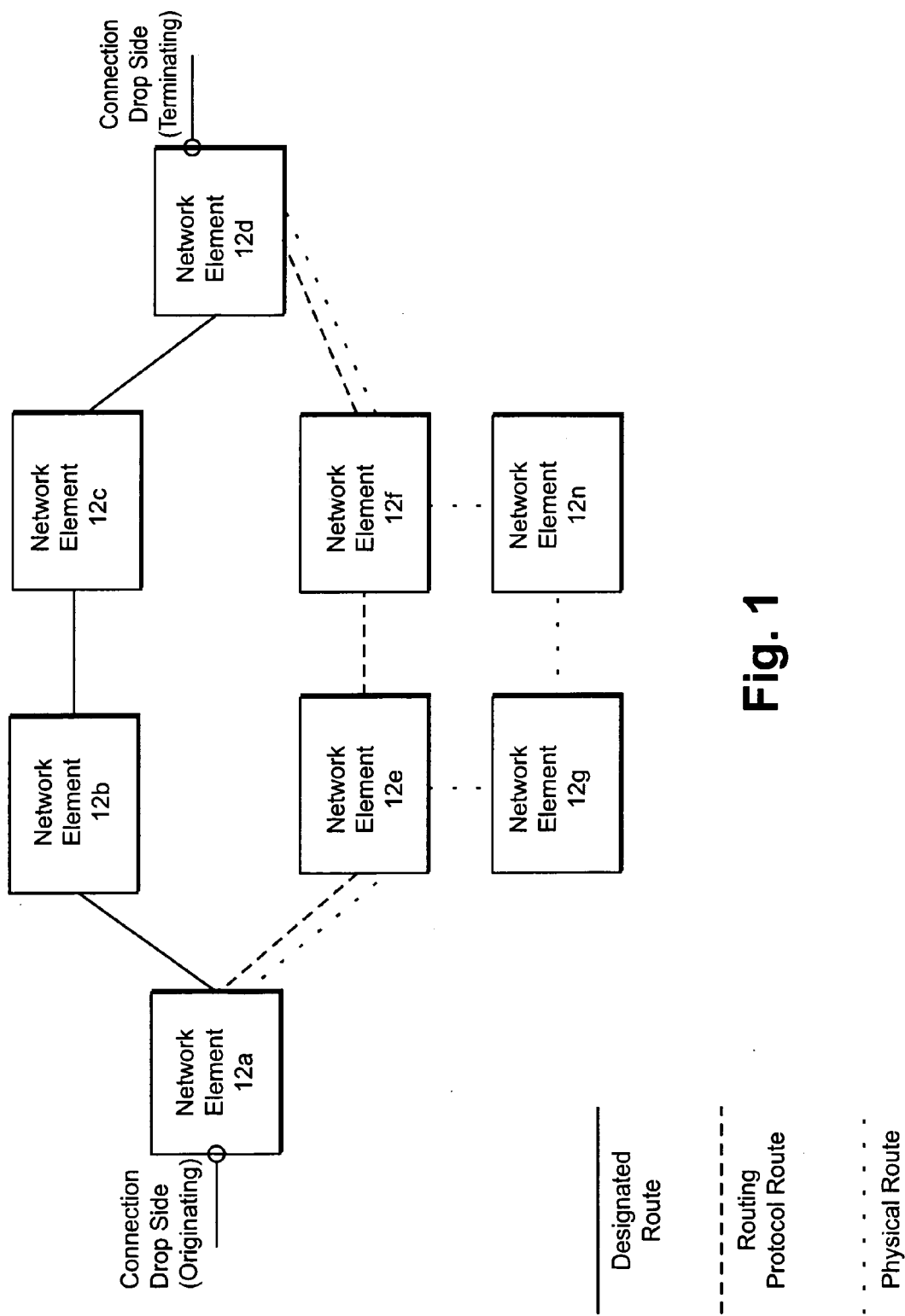

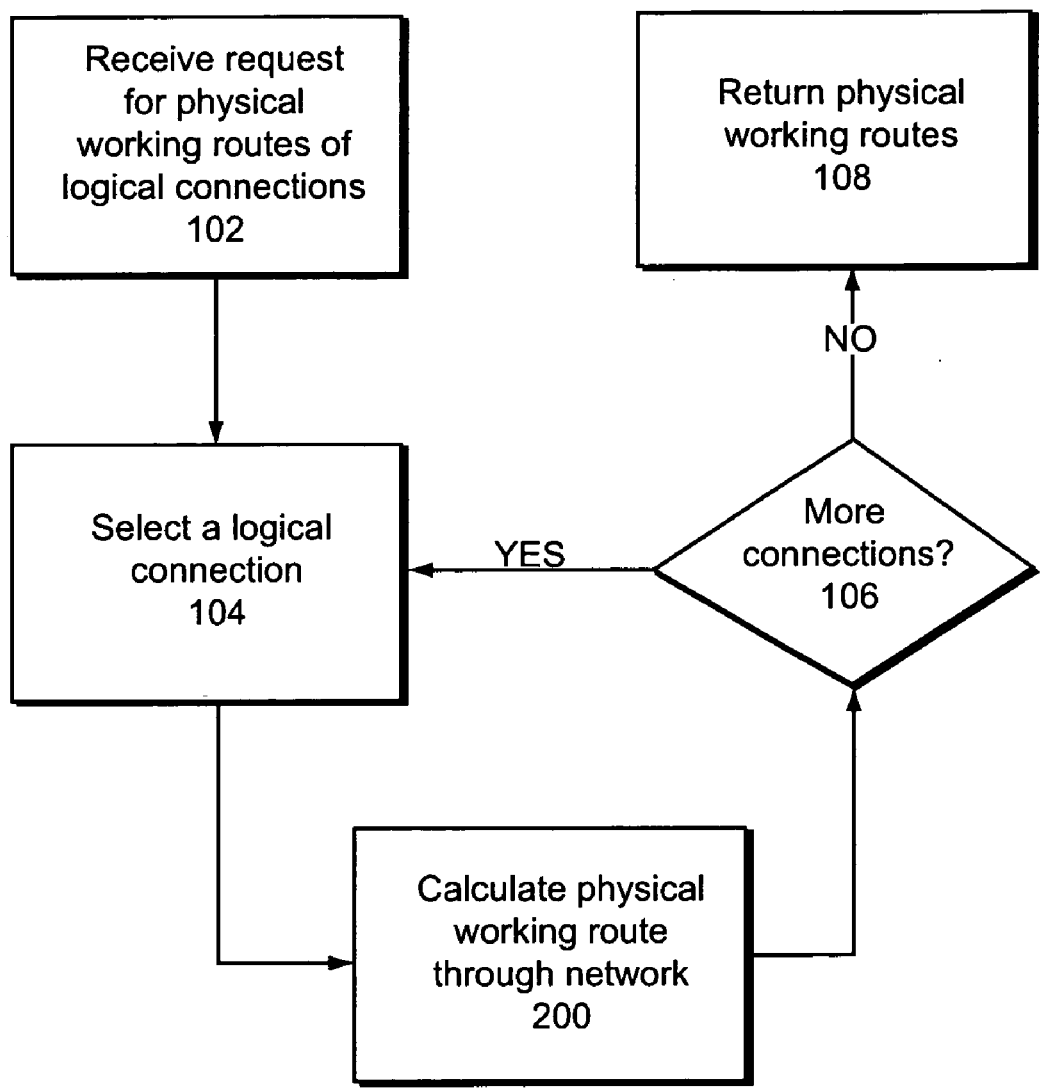
Fig. 5A     100

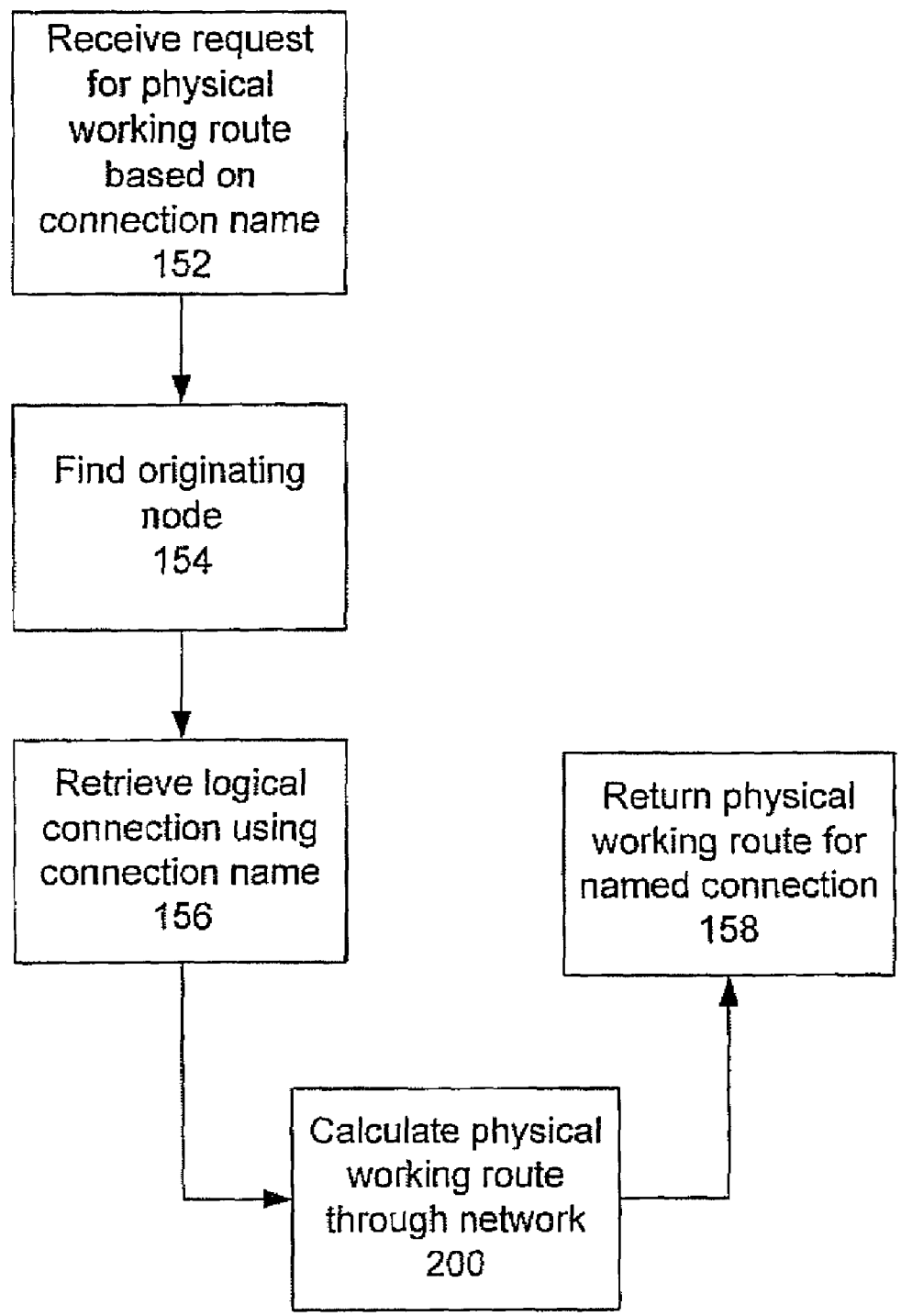
FIG. 5B      150

Fig. 9     500

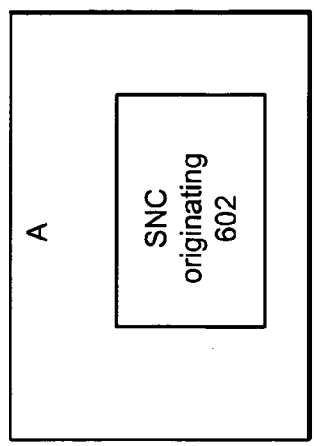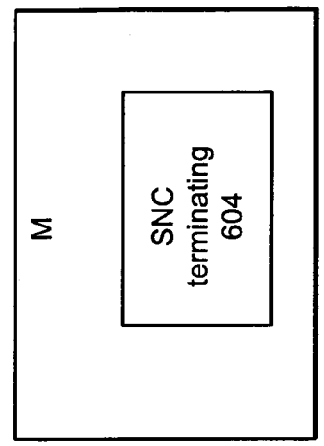
Fig. 10

CALCULATING PHYSICAL ROUTES IN A COMMUNICATION NETWORK

CROSS-REFERENCE TO RELATED APPLICATIONS

The present application is related to U.S. patent application Ser. No. 09/259,263 filed on Mar. 1, 1999, entitled "Routing and Signaling in a SONET Network", U.S. patent application Ser. No. 09/493,344 filed Jan. 28, 2000, entitled "System and Method for Calculating Protection Routes in a Network Prior to Failure", U.S. patent application Ser. No. 09/421,062, filed on Oct. 19, 1999, entitled "Virtual Line Switched Ring" and U.S. patent application Ser. No. 09/919,779, filed on Jul. 31, 2001, entitled Method of Protecting As Against Span Failures In A Communication Network, which are each incorporated by reference in their entirety herein.

BACKGROUND OF THE INVENTION

1. Field of the Invention

The present invention relates generally to communications. More particularly, the invention relates to communication networks.

2. Description of the Background Art

Traditional communication networking technologies were designed for a world of moderate traffic growth with relatively stable and predictable traffic patterns. Such systems were simply not designed to handle the explosive growth in bandwidth demand coupled with the dynamic nature of traffic patterns created by emerging broadband, Internet, and wireless applications. As communication service providers discovered, efforts to scale networks through brute force application of legacy technologies have resulted in escalating capital and operating costs that outpace revenue growth.

Such a dramatic shift in the environment requires a fundamental shift in network architectures in order to realize the full potential of modem applications. Service providers are now demanding more network elements with unconstrained scalability, agility, and efficiency essential for sustained success in an increasingly challenging environment.

However, because network elements automatically re-route connections on both service and line levels within the network, the actual physical routes being utilized by the logical connections becomes less apparent from the point-of-view of the network operators. This obscuring of the physical routes makes it more difficult to provide functionalities, such as those related to service level management and fault management.

BRIEF DESCRIPTION OF THE DRAWINGS

FIG. 1 is a high-level diagram of a communication network that illustrates various routes for a connection.

FIG. 5A is a high-level flow chart depicting a process for receiving a request for physical working routes and responding to same in accordance with an embodiment of the invention.

FIG. 5B is a high-level flow chart depicting a process for receiving a request for the physical working route based on a connection name and responding to same in accordance with an embodiment of the invention.

FIG. 10 is a schematic diagram illustrating an originating node and a terminating node for a logical connection in accordance with an embodiment of the invention.

SUMMARY

Figure 2A:
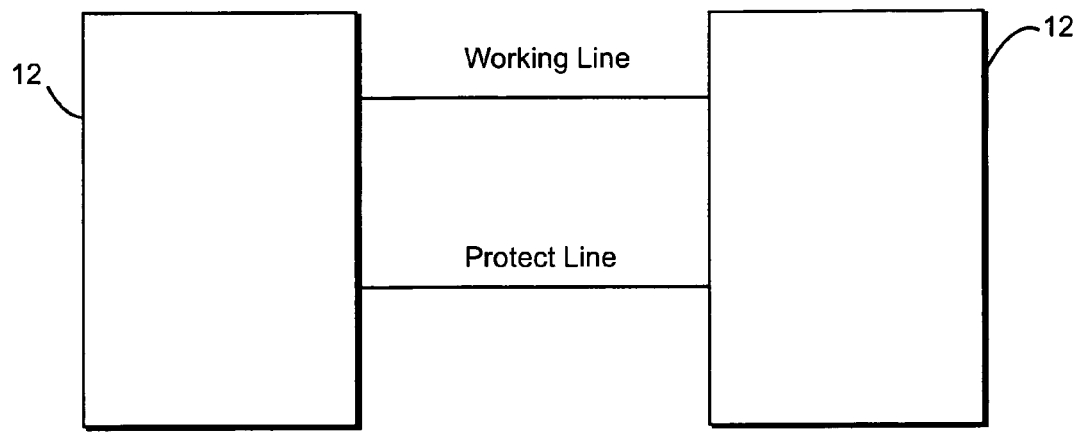
FIG. 2A is a schematic diagram illustrating 1+1 APS protection schemes.

One embodiment of the invention is a system that maps service-level information comprising logical connections to physical-level information comprising working physical paths of the logical connections, where the physical-level information is obscured by activation of protect schemes within the communication network.

Another embodiment of the invention is a method for calculating a physical route for a logical connection in a network. The method includes accessing each network element (node) along a logical working path for connection, calculating an ingress point for each node along the logical working path, and calculating an egress point for each node along the logical working path.

Another embodiment of the invention is a system for calculating a physical route for a logical connection in a communication network. The system includes a logical path finder for determining the logical working path for the connection, a communication channel to access each node along the logical path, and a physical route calculator for calculating an ingress point for each node along the logical path and calculating an egress point for each node along the logical path.

DETAILED DESCRIPTION OF EMBODIMENTS OF THE PRESENT INVENTION

Obscuring of Physical Routes in Communication Networks

Recently, important technological advances have been made in adding intelligent network elements to communication networks. The network element may be, for example, a CoreDirector™ switch available from CIENA Corporation with a place of business at 1201 Winterson Road, Linthicum, Md. 21090 (hereinafter referred to as "CIENA"). The CIENA CoreDirector switch is designed to rapidly deliver a wide range of differentiable end-to-end capacity across the network, with operational simplicity and flexible protection techniques. Typically such a network element supports both a signaling protocol and a routing protocol. For example, a network element, such as the CoreDirector™ switch support an Optical Signaling and Routing Protocol ("OSRP"), which is described in more detail in commonly owned and co-pending U.S. patent applications Ser. No. 09/259,263 filed on Mar. 1, 1999, entitled "Routing and Signaling in a SONET Network", and Ser. No. 09/493,344 filed Jan. 28, 2000, entitled "System and Method for Calculating Protection Routes in a Network Prior to Failure", which are each incorporated by reference in their entirety herein. The routing protocol in OSRP is responsible for discovery of neighbors and link status, reliable distribution of routing topology information and optimal route determination. The signaling protocol provides the capability of establishing, tearing down and modifying connections across a network of nodes. Alternative protocols, such as the private network to node interface (PNNI) protocol, also can be implemented within the network element. In addition, a communication network may be based upon any type of scheme including SONET/SDH (reference to SONET hereinafter shall mean either SONET or SDH), ATM or TCP/IP.

FIG. 1 is a high-level diagram of a communication network that illustrates various routes for a connection. The communication network as depicted includes various network elements 12a through 12h. As mentioned above, a network element may be, for example, a CoreDirector™ switch available from CIENA Corporation. In the example illustrated in FIG. 1, there is a connection originating at network element 12a and terminating at network element 12d.

The designated route for the connection comprises an explicitly provisioned route for the connection. In the illustrated example, the designated route for the connection goes from network element 12a, to network element 12b, to network element 12c, and finally to network element 12d. In contrast to the designated route, at one moment in time, the routing protocol route may automatically place this connection from network element 12a, to network element 12e, to network element 12f, and finally to network element 12d. In either case, the route information is transmitted to other network elements in the network and cross-connects associated with the routes are configured.

However, in addition to a routing and signaling protocol, SONET level line and ring protection schemes may also dynamically reroute connections in the event of a failure of one or more physical links. This automatic re-routing due to such protection schemes increases the robustness of the connections in the network. However, the automatic re-routing also creates substantial difficulties and challenges in determining the actual physical links being used for a logical connection at a point in time. The actual physical route being used for a logical connection will vary from time to time in a complex manner that depends on the activation of the protection schemes within the communication network.

This means that the actual physical route for the connection may not correspond to either the designated route or the routing protocol route. For example, the physical route may vary from the routing protocol route due to activation of protection schemes. In the illustrated example, the physical route for the connection goes from network element 12a, to network element 12e, to network element 12g, to network element 12h, to network element 12f, and finally to network element 12d.

Non-limiting examples of such protection schemes that may change a physical route are described below in relation to FIGS. 2 through 4.

Figure 2B:
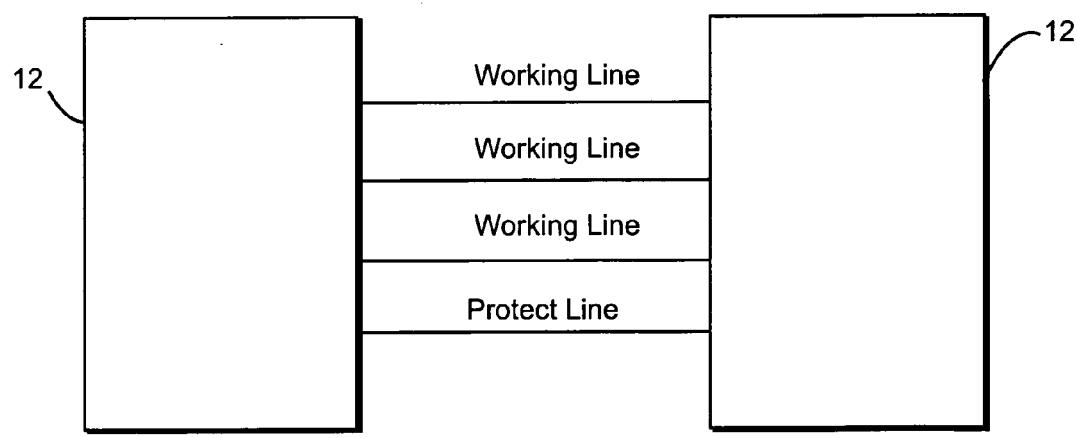
FIG. 2B is a schematic diagram illustrating 1:N APS protection schemes.

FIGS. 2A and 2B are schematic diagrams illustrating 1+1 and 1:N automatic protection switching (APS) protection schemes, respectively, for network elements 12. These APS protection schemes are specific embodiments of span-only protection schemes. FIG. 2A depicts APS Linear 1+1 Protection. In 1+1 APS protection, working traffic is sent on both working and protect lines. Hence, the protect line cannot be used for lower priority traffic. A transmitting node transmits two identical signals over the two lines while the receiving node determines the better of the two received signals and uses that better signal.

FIG. 2B depicts APS 1:N Protection. In 1:N APS protection, the protect line may be used for extra traffic when the protection is not activated. If the protection is activated, then the extra traffic is pre-empted by the traffic that is re-routed from a failed working line to the protect line.

Figure 3:
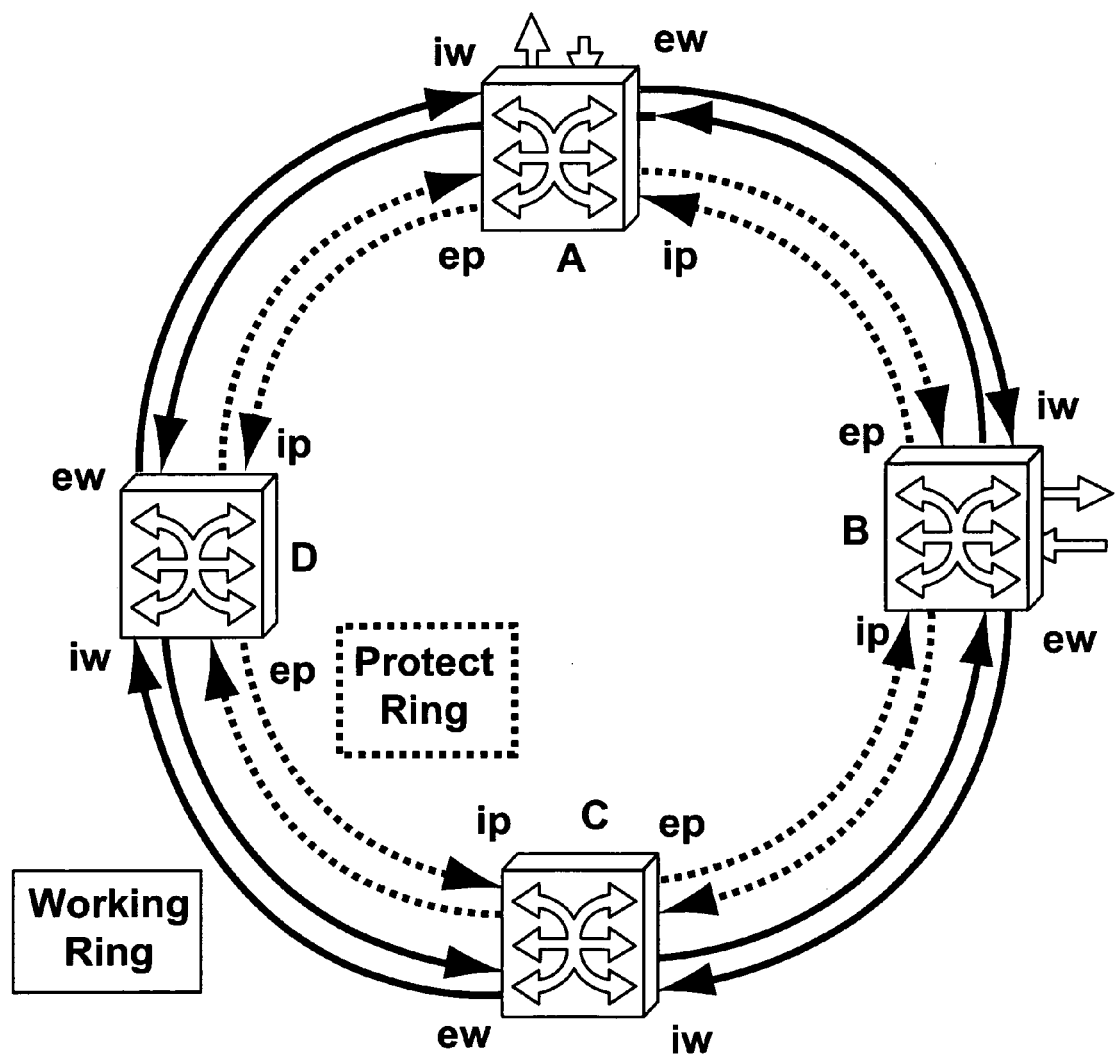
FIG. 3 is a schematic diagram illustrating working and protect rings under a VLSR protection scheme.

FIG. 3 is a schematic diagram illustrating working and protect rings of the network elements 12 in the a virtual line switched ring (VLSR) protection scheme. VLSR protection is a specific embodiment of a ring/span protection scheme. As depicted, the ring includes four fibers between each node 12. A first fiber pair is a working line (solid lines), and a second fiber pair is a protect line (dashed lines). In VLSR protection, a ring of up to 16 nodes may be supported. Each connecting span contains at least one working line with a corresponding protect line in a one-to-one ratio. The protection groups are configured on each node of the ring. In the example illustrated, there is a connection going over the working link from node A to node B.

Figure 4:
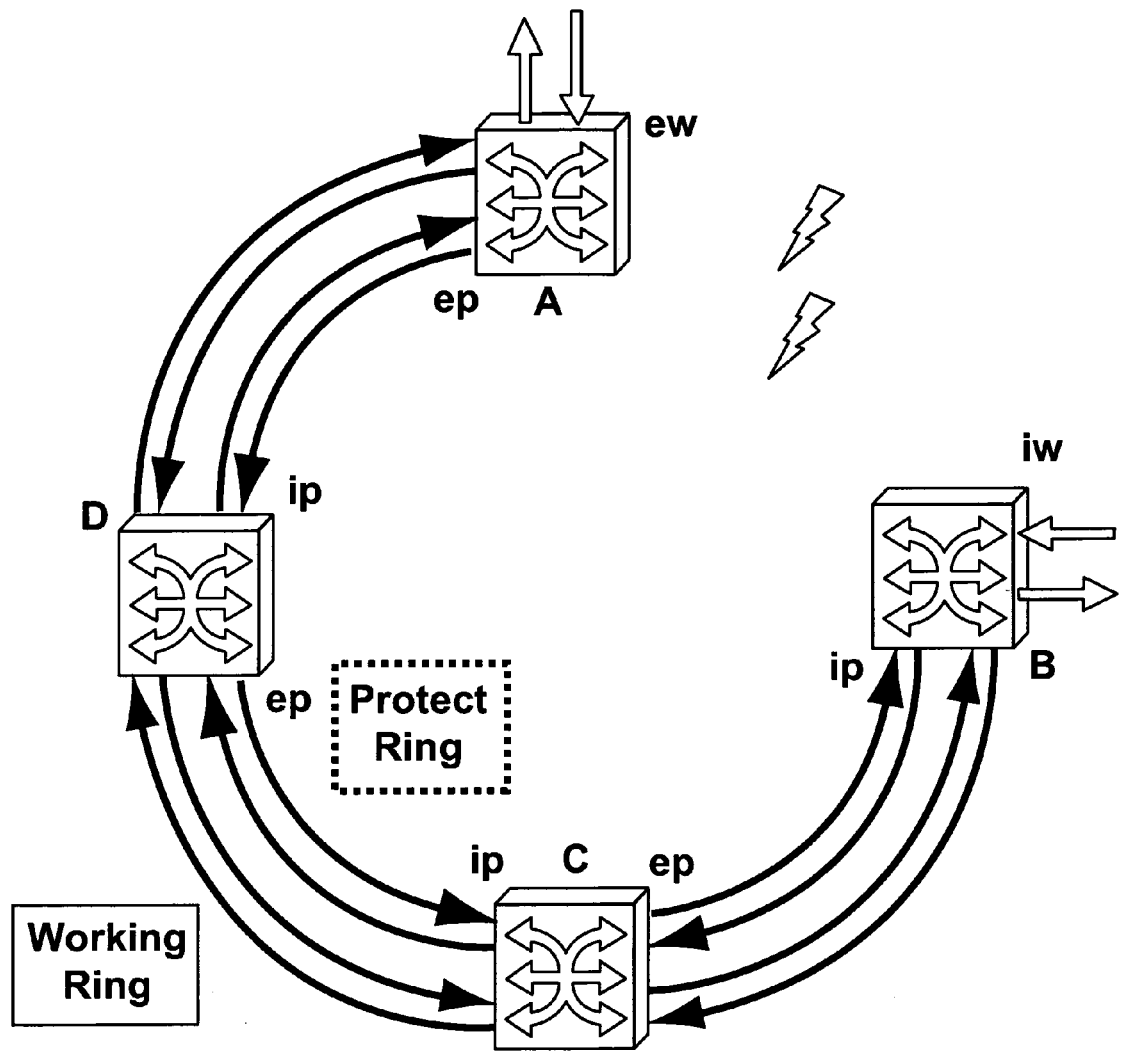
FIG. 4 is a schematic diagram illustrating activation of a protect ring under a VLSR protection scheme.

FIG. 4 is a schematic diagram illustrating activation of a protect ring under VLSR protection scheme. In the example shown, the span between nodes A and B fails. For example, a failure of the span may be due to a physical break of the fibers or some other disruption, which results in activation of the ring protection. With the activation of a ring switch, the traffic formerly carried on the working lines between A and B now loops back on protect lines from Node A to Node D, then from Node D to Node C, then from Node C to Node B. On the other hand, if only the working lines, but not the protect lines, between nodes A and B were broken, then a span switch (not a ring switch) would be activated. The span switch would involve moving traffic between A and B to the protect line pair (instead of the broken working line pair).

Calculating Actual Physical Routes

An embodiment of the present invention provides a method and system for calculating the actual physical routes being used in communication networks. One embodiment of the invention comprises a method for calculating an actual physical route for a logical connection in a communication network. The method includes accessing each network element (node) along a logical working path for the connection, calculating an ingress port for each node along the logical path, and calculating an egress port for each node along the logical path.

FIG. 5A is a high-level flow chart depicting a process for receiving a request for physical working routes and responding to same in accordance with an embodiment of the invention. In one embodiment, the process 100 may be applied to discover the actual physical working routes of logical connections in an optical switching network. The process 100 as depicted includes five steps (102, 104, 200, 106, and 108).

In the first step 102, a request is received for actual physical working routes of one or more logical connections in a network.

For example, the request may cover the set or group of logical connections relating to a particular communication service provider. The request may be received, for example, from network (element) management applications, such as CIENA's ON-Center™ Network Management Suite.

In the second step 104, one of the logical connections covered by the request is selected or considered. In the third step 200, the physical working route through the network for that logical connection is calculated or determined. This step 200 is described in more detail below in relation to FIG. 6. In the fourth step 106, a determination is made as to whether more connections need to be selected or considered. If so, the process 100 loops back to the second step 104. Otherwise, the process 100 goes on to the fifth step 108. Finally, in the fifth step 108, the calculated physical working routes are returned in response to the request.

Note that the second 104, third 200, and fourth 106 steps described above comprise an example loop that processes the logical connections covered by the request in accordance with one embodiment. In alternate embodiments, the steps (104, 200, and 106) may not be followed literally. In other words, the physical working routes need not be calculated one by one. Instead, more than one physical working route may be calculated in parallel. Also, a common step may be executed that is useful in the calculation of a plurality of working routes. For example, the retrieval of cross-connect data from the network elements 12 may be a common step that is useful in the calculation of a plurality of working routes.

Note also that the system may utilize a queue to order the connections for which physical working routes are to be calculated. For example, if a particular connection is not calculable at that moment (for example, due to a temporary state of the network), it may be marked for calculation at a later time. The process may then go on to calculate the physical route for the next connection in the queue. After the queue has been processed once, those connections marked may be revisited to see if the physical route may now be calculated.

FIG. 5B is a high-level flow chart depicting a process 150 for receiving a request for the physical working route based on a connection name and responding to same in accordance with an embodiment of the invention. The process 150 as depicted includes five steps (152, 154, 156, 200, and 158).

In the first step 152, a request is received for the physical working route based on a connection name. Subsequently, the originating node for the connection is found in the second step 154, and the logical connection corresponding to the connection name is retrieved from the originating node in the third step 156. In the fourth step 200, the physical working route through the network for that logical connection is calculated or determined. This step 200 is described in more detail below in relation to FIG. 2. Finally, in the fifth step 158, the calculated physical working route is returned in response to the request.

Figure 6:
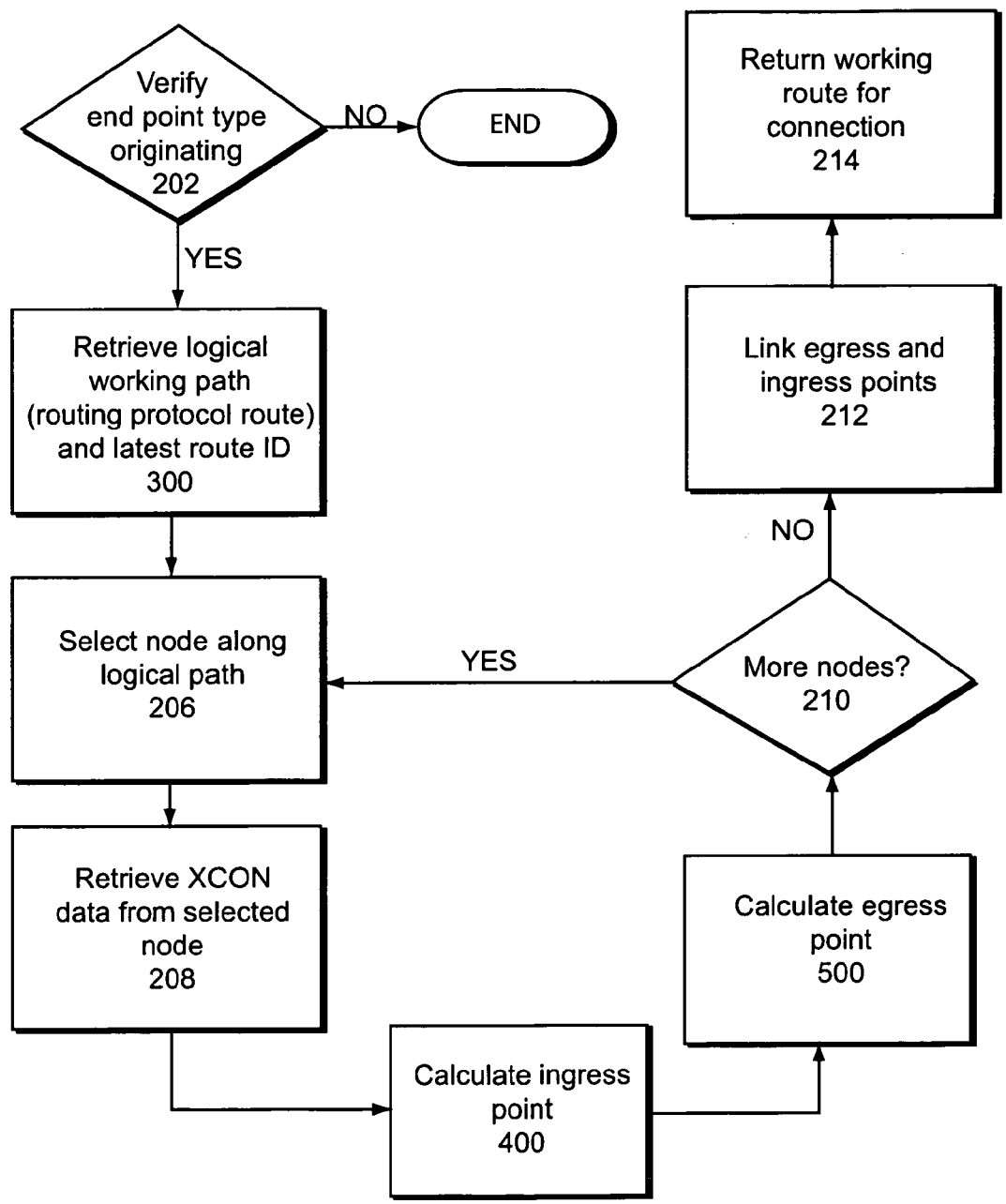
FIG. 6 is a flow chart depicting a method for calculating a physical working route for a logical connection in accordance with an embodiment of the invention.

FIG. 6 is a flow chart depicting a method for calculating a physical working route for a logical connection in accordance with an embodiment of the invention. In accordance with a logical embodiment, the method 200 may be applied to discover the actual physical working routes of logical connections in a communications network. The method 200 as depicted includes nine steps (202, 300, 206, 208, 400, 500, 210, 212, and 214).

In the first step 202, an end point type is verified to be originating (and not terminating). Here, an end point refers to a network element (or node) at one of the ends of the logical connection within the network. In accordance with a logical embodiment, the node may comprise an intelligent network switch, such as a CIENA CoreDirector™ switch. The end point type may be, for example, a specific data field that is retrieved from an end point node. In a logical embodiment, the end point type may be either originating or terminating. A logical connection as provisioned starts at an originating node and ends at a terminating node. In accordance with the logical embodiment, if the end point type is originating, the method 200 proceeds to the second step 300. On the other hand, if the end point type is terminating, then the method 200 does not have to proceed and may instead end. This is because calculating physical routes from the originating node 12 of each logical connection should be sufficient. Calculating the same for the terminating node would be redundant.

In the second step 300, a logical working path for the connection is obtained. The logical working path may be called a working "designated transit list" (DTL). The working DTL is the route determined by the routing protocol, depicted in FIG. 1. In addition, in a specific embodiment, the latest route ID (which may also be referred to as a reincarnation number) associated with the logical connection is retrieved. (The route ID is encoded in a cross-connect (XCON) associated with this connection.) This step 300 is described in more detail below in relation to FIG. 7.

In the third step 206, one of the nodes along the logical path is selected or considered. The set of nodes 12 along the logical path include the originating node, the terminating node, and the nodes 12 in between them along the path. As mentioned above, in a specific embodiment, the node may comprise an intelligent network switch, such as a CIENA CoreDirector™ switch.

In the fourth step 208, a cross-connect (abbreviated as XCON) for the connection of interest is retrieved from the selected node 12. The XCON retrieved in this step 208 includes ingress and egress related information for the connection of interest. In a specific embodiment, the particular XCON may be identified for retrieval by matching a name field with that of an originating XCON.

In the fifth step 400, a calculation or determination is made of the ingress point for the logical connection at the node 12. The ingress point needs to be calculated or determined because various protection schemes may re-route the actual physical connection to different ingress points depending on the working state of the network. In one embodiment, the ingress point may comprise an ingress port at the node 12. This step 400 is described in more detail below in relation to FIG. 8.

In the sixth step 500, a calculation or determination is made of the egress point for the logical connection at the node 12. Like the ingress point, the egress point needs to be calculated or determined because various protection schemes may re-route the actual physical connection to different egress points depending on the working state of the network. In one embodiment, the egress point may comprise an egress port at the node. This step 500 is described in more detail below in relation to FIG. 9.

In the seventh step 210, a determination is made as to whether more nodes along the logical path need to be selected or considered. If so, the method 200 loops back to the third step 206. Otherwise, the method 200 goes on to the eighth step 212.

In the eighth step 212, the calculated egress and ingress points are linked appropriately to form the physical working route. This linking is illustrated in FIG. 13B (described below). Basically, except for the terminating node, each node's egress point is linked to the ingress point of the next node along the logical working path. (Or, equivalently, except for the originating node, each node's ingress point is linked to the egress point of the preceding node along the logical working path.)

Finally, in the ninth step 214, the calculated physical working route for the logical connection is returned to complete the method 200. As described above, the calculated working route may comprise the calculated ingress and egress points for the nodes along the logical path. These calculations take into account the activation of protection schemes that may re-route the physical working path.

Figure 7:
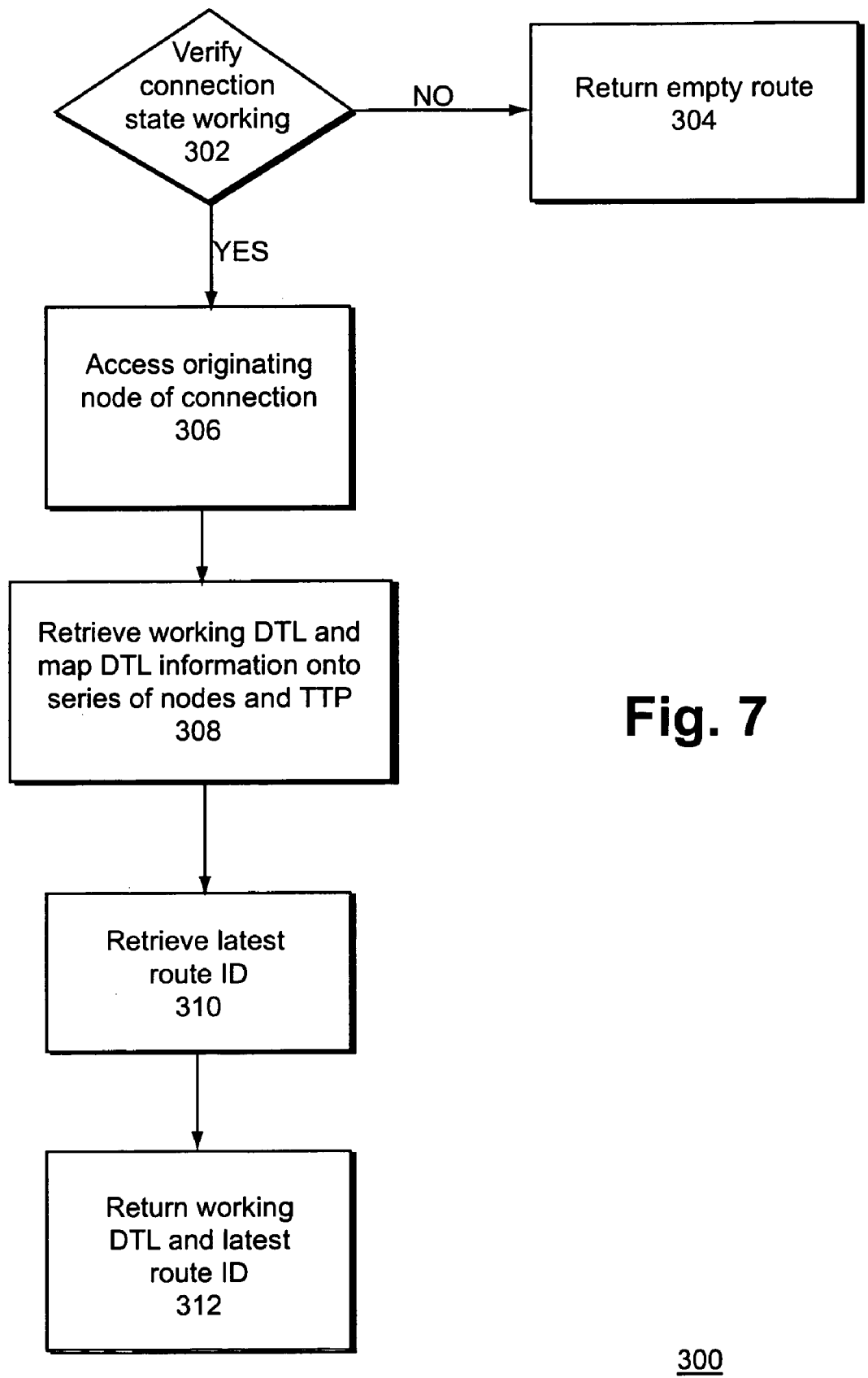
FIG. 7 is a flow chart depicting a method for retrieving a logical working path and latest Route ID for the connection in accordance with an embodiment of the invention.

FIG. 7 is a flow chart depicting a method for retrieving a logical working path and latest route identification (route ID) for the connection in accordance with an embodiment of the invention. As described above, the logical path may be called a working designated transit list (DTL). The working DTL is the route determined by the routing protocol illustrated in FIG. 1. The method 300 as depicted includes six steps (302, 304, 306, 308, 310, and 312).

In the first step 302, a connection state is verified to be in a working state. In one embodiment, the connection state may be either in a working state or in one or more non-working states. The working state indicates that there is a working route for the connection. If the end point state is in a working state, then the method 300 proceeds to the third step 306. Otherwise, if the end point state is a non-working state, then the method 300 goes to the second step 304 where an empty route (empty DTL) is returned. This is because the non-working state indicates an absence of a working route for the connection.

In the third step 306, in accordance with one embodiment, the originating node for a logical connection may be accessed. As described above, the originating and terminating nodes are, respectively, the beginning and end nodes provisioned for a logical connection. In this specific embodiment, the originating node is accessed because it contains information relating to the logical working path for the connection. In alternate embodiments, if another resource contains information relating to the logical working path for the connection, then that resource may be accessed instead.

In the fourth step 308, information relating to the logical working path for the connection is retrieved. In one embodiment, the logical working path for the connection is stored as a designated transit list (DTL) at the originating node. The DTL information is mapped onto a series of nodes and ports of the logical path.

In the fifth step 310, a latest route ID for the connection of interest may also be identified and retrieved from the originating node as part of the XCON associated with this connection. In a specific embodiment, the latest route ID may be found by examining XCON "reincarnation" numbers, where the largest reincarnation number corresponds to the latest route ID. This most recent route ID will later be used to retrieve XCON data from other nodes along the working DTL.

Finally, in the sixth step 312, the working DTL (logical working path) and the latest route ID are returned to complete the method 300.

Figure 8:
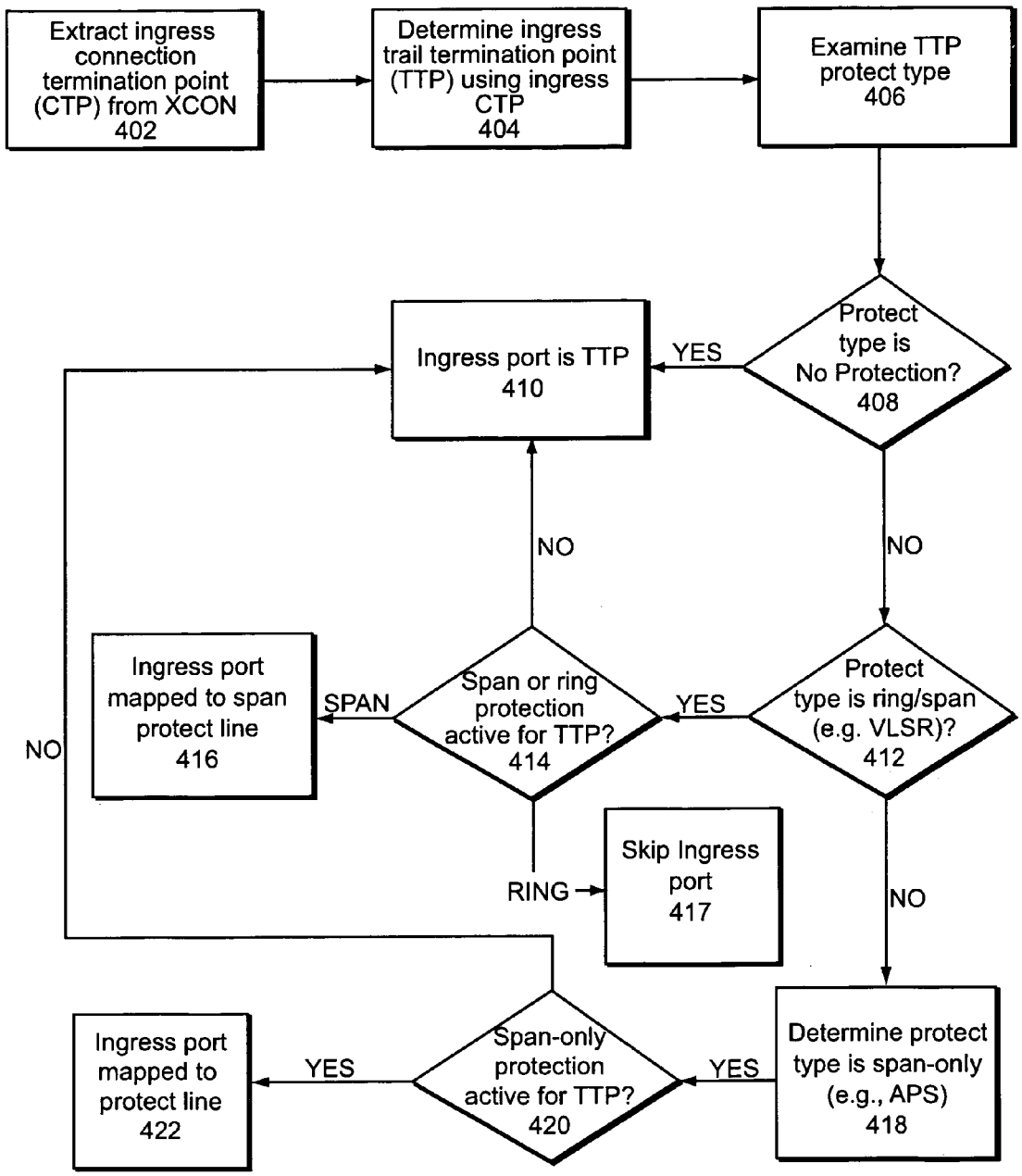
FIG. 8 is a flow chart depicting a method for calculating an ingress point in accordance with an embodiment of the invention.

FIG. 8 is a flow chart depicting a method for calculating an ingress point for a node in accordance with an embodiment of the invention. The ingress point needs to be calculated because it may change depending on activation of a protection scheme. The method 400 as depicted includes eleven steps (402, 404, 406, 408, 410, 412, 414, 416, 418, 420, and 422).

In the first step 402, the ingress connection termination point (CTP) is extracted from the XCON data set for the node. From a CTP, the channels (e.g., timeslots) for the connection may be found. A node should have one ingress CTP and one egress CTP for each connection. A CTP may or may not be part of a group termination point (GTP). If a CTP is part of a GTP, then the GTP is extracted, and the GTP gives the contained CTPs.

In the second step 404, the ingress trail termination point (TTP) is determined using the ingress CTP. A TTP comprises a logical termination point that may correspond to different physical termination points depending on the activation of protection schemes. In a specific embodiment, the logical TTP may be found from a supporting termination point field of the CTP.

In the third step 406, a protect type field of the ingress TTP is examined. The protect type indicates whether the TTP is covered by any protection scheme.

In the fourth step 408, if the protect type indicates no protection is covering the ingress TTP, then the method 400 proceeds to the fifth step 410. Otherwise, the method 400 moves on to the sixth step 412 described below. In the fifth step 410, since no protection is covering the ingress TTP, the ingress point may be determined in a straightforward manner. In a specific embodiment, the ingress port may comprise the TTP port.

In the sixth step 412, if the protect type indicates a ring/span type of protection is covering the ingress TTP, then the method 400 proceeds to the seventh step 414. Otherwise, the method 400 moves on to the ninth step 416 described below. In one specific embodiment, the ring/span type of protection comprises a Virtual Line Switched Ring ("VLSR™") or SMARTRING$_{VLSR}$ feature available on a CoreDirector™ switch from CIENA and described in more detail in U.S. patent application Ser. No. 09/421,062, entitled Virtual Line Switched Ring, which was filed on Oct. 19, 1999, and which is incorporated by reference herein in its entirety. CIENA's VLSR includes both span and ring protection. A span may be defined as a transmission facility between two nodes. A ring may be defined as a configuration of nodes connected in a circular or cyclical fashion.

In the seventh step 414, a determination is made as to whether or not the span or ring protection is active. In one specific embodiment, the logical TTP may be used to identify a protect unit (PU) for the TTP and, if applicable, a protect group (PG) containing the PU. A span state field of the PU may then be examined to determine whether the span or ring protection is idle or active. If the no protection is active, then the method 400 goes back to the fifth step 410, wherein the ingress port is mapped to the TTP port. If the span protection is active, then the method 400 proceeds to the eighth step 416. In the eighth step 416, the ingress port is mapped to the port of the span protect line of the PU. If the ring protection is active, then the method proceeds to step 417. In step 417, this ingress point is skipped because this point will be processed by method 1000 as we calculate the ring diversion for ring protection switch.

In the ninth step 418, the protect type may be determined to be a span-only type of protection covering the ingress TTP. This may be assumed if there are only two types of protection (ring/span and span-only types). Otherwise, this determination may be made by examination of the protect type field. In one specific embodiment, the span-only type of protection may comprise the APS (Automatic Protection Switching).

In the tenth step 420, a determination is made as to whether or not the span-only protection is active. In one specific embodiment, the logical TTP may be used to identify a protect line for the TTP. (For example, the protect line may be assigned solely to the TTP in the APS 1+1 protection scheme, or the protect line may be shared amongst TTPs in a protect group in the APS 1:N protection scheme.) The protect line is then examined to confirm whether or not it is actively protecting the logical TTP. If the protection is not confirmed to be active, then the method 400 goes back to the fifth step 410, wherein the ingress port is mapped to the TTP port. If the protection is confirmed to be active, then the method 400 proceeds to the eleventh step 422. In the eleventh step 422, the ingress port is mapped to the port of the protect line.

Figure 9:
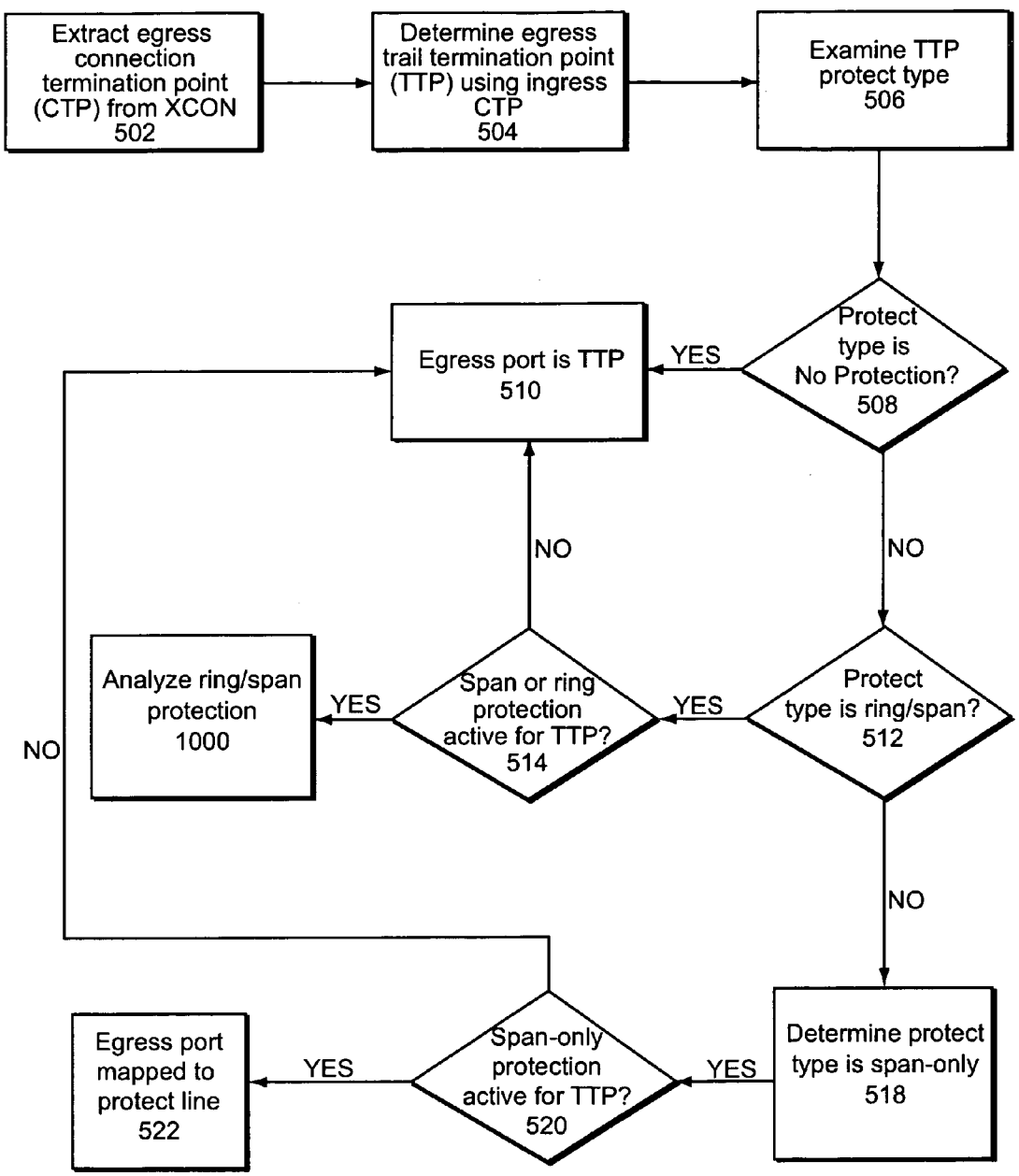
FIG. 9 is a flow chart depicting a method for calculating an egress point in accordance with an embodiment of the invention.

FIG. 9 is a flow chart depicting a method for calculating an egress point in accordance with an embodiment of the invention. The egress point needs to be calculated because it may change depending on activation of a protection scheme. The method 500 as depicted includes eleven steps (502, 504, 506, 508, 510, 512, 514, 516, 518, 520, and 522).

In the first step 502, the egress connection termination point (CTP) is extracted from the XCON data set for the node. As stated above, from a CTP, the channels (e.g., timeslots) for the connection may be found. A CTP may or may not be part of a group termination point (GTP). If a CTP is part of a GTP, then the GTP is extracted, and the GTP gives the contained CTPs.

In the second step 504, the egress trail termination point (TTP) is determined using the egress CTP. As stated above, a TTP comprises a logical termination point that may correspond to different physical termination points depending on the activation of protection schemes. In a specific embodiment, the logical TTP may be found from a supporting termination point field of the CTP.

In the third step 506, a protect type field of the egress TTP is examined. The protect type indicates whether the TTP is covered by any protection scheme.

In the fourth step 508, if the protect type indicates no protection is covering the egress TTP, then the method 500 proceeds to the fifth step 510. Otherwise, the method 500 moves on to the sixth step 512 described below. In the fifth step 510, since no protection is covering the egress TTP, the egress point may be determined in a straightforward manner. In a specific embodiment, the egress port may comprise the TTP port.

In the sixth step 512, if the protect type indicates a ring/span type of protection is covering the egress TTP, then the method 500 proceeds to the seventh step 514. Otherwise, the method 500 moves on to the ninth step 516 described below. In one specific embodiment, the ring/span type of protection comprises a VLSR, which includes both span and ring protection.

In the seventh step 514, a determination is made as to whether either span or ring protection is active. Here, because we are considering the egress point, we are concerned with both span protection and ring protection. In other words, the egress point is affected by either an active span protection or an active ring protection. If neither the span or ring protection is active, then the method 500 goes back to the fifth step 510, wherein the egress port is mapped to the TTP port. If either the span or ring protection is active, then the method 500 proceeds to the eighth step 1000, wherein the VLSR protection may be analyzed. The analysis of the eighth step 1000 is described further below in relation to FIG. 14.

In the ninth step 518, the protect type may be determined to be a span-only type of protection covering the egress TTP. This may be assumed if there are only two types of protection (ring/span and span-only types). Otherwise, this determination may be made by examination of the protect type field. In one specific embodiment, the span-only type of protection may comprise the APS feature available on CoreDirector™ switches from CIENA.

In the tenth step 520, a determination is made as to whether or not the span-only protection is active. If the span-only protection is not active, then the method 500 goes back to the fifth step 510, wherein the egress port is mapped to the TTP port. If the span-only protection is active, then the method 500 proceeds to the eleventh step 522. In the eleventh step 522, the egress port is mapped to the port of the active protect line.

FIG. 10 is a schematic diagram illustrating an originating node and a terminating node for a logical connection within a network in accordance with an embodiment of the invention. As stated above, in accordance with one embodiment, each node 12 may comprise a switch, such as, for example, a CIENA CoreDirector™ switch. In this example, one node is designated "A," and the other node is designated "M." The logical connection between nodes A and M may be called a subnetwork connection (SNC). As depicted in FIG. 10, node A is the SNC originating node for the SNC of interest, and node M is the SNC terminating node for the SNC of interest. The A and M nodes are the end nodes for that particular SNC, which is setup across the network.

Figure 11:
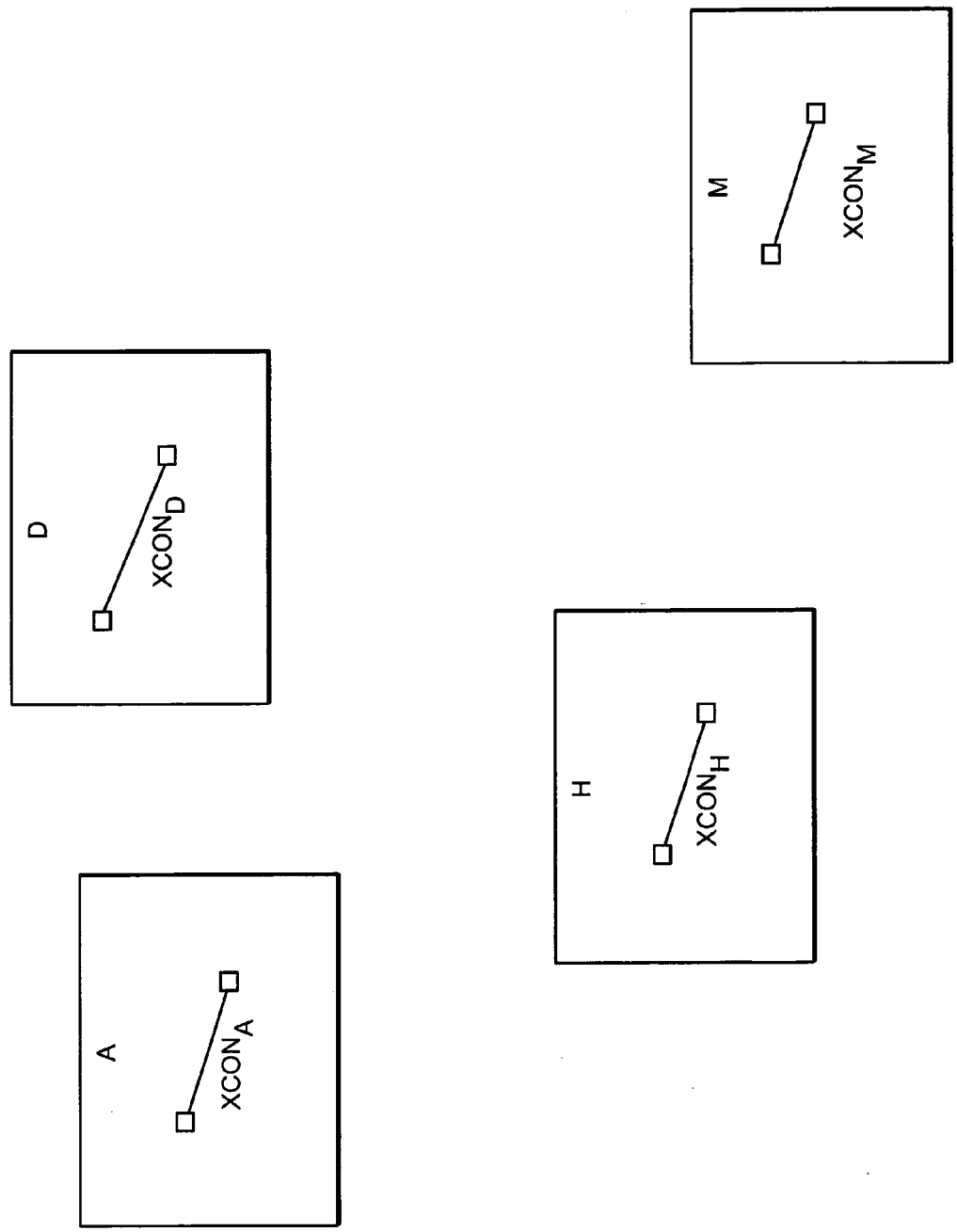
FIG. 11 is a schematic diagram illustrating nodes along a logical working path (working DTL) in accordance with an embodiment of the invention.

FIG. 11 is a schematic diagram illustrating nodes along a logical working path (e.g., working DTL) through a network in accordance with an embodiment of the invention. In this example, two intermediate nodes (those in between the end point nodes A and M) are designated "D" and "H." Of course, in other examples, more or fewer than two intermediate nodes may be present in the logical working path. Also depicted in FIG. 11 are XCON data for the logical connection (SNC), where each node has an XCON data associated with the logical connection. The XCON data are designated $XCON_A$ for originating node A, $XCON_D$ for first intermediate node D, $XCON_H$ for second intermediate node H and $XCON_M$ for terminating node M.

Figure 12:
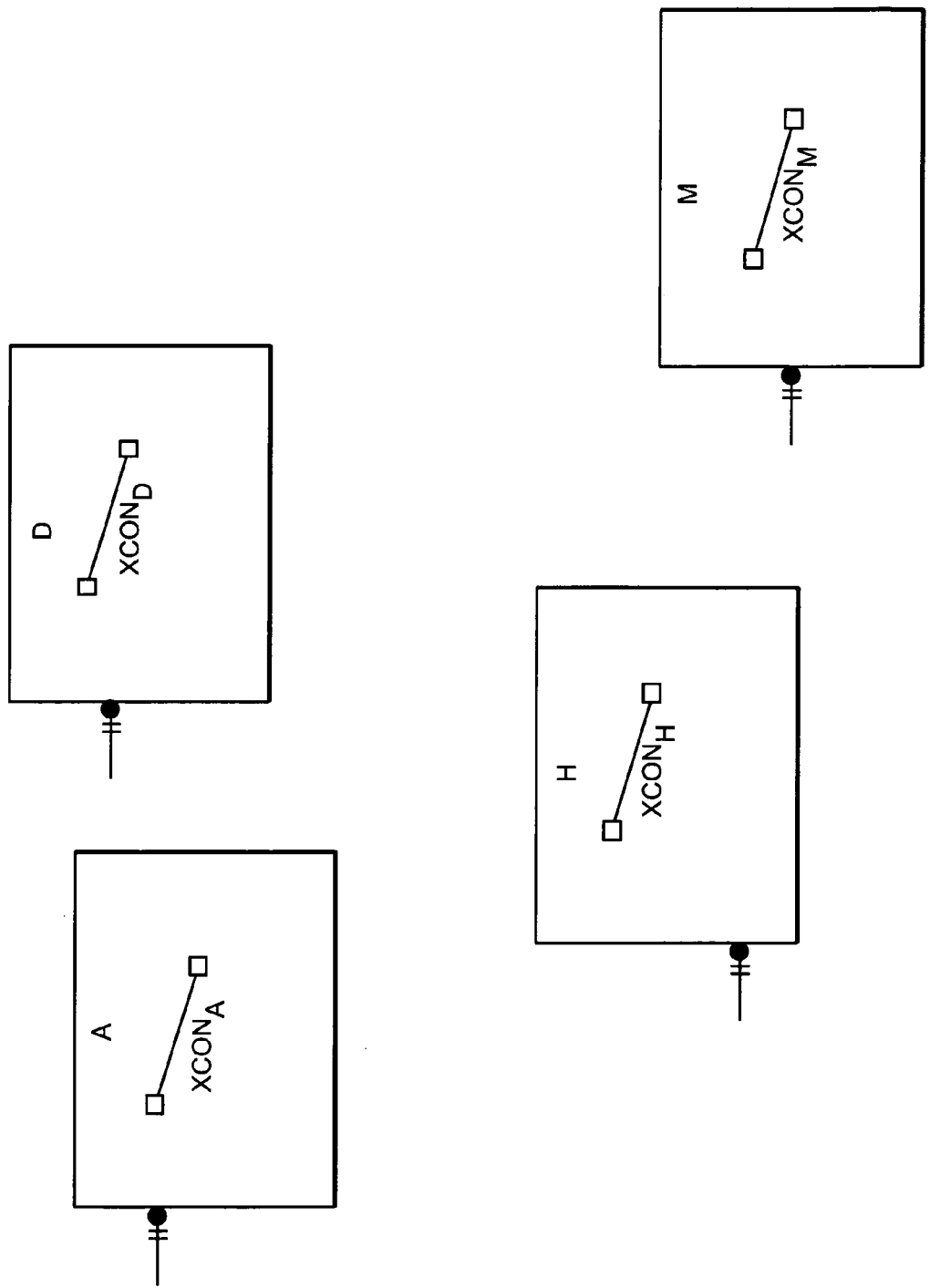
FIG. 12 is a schematic diagram illustrating ingress points for nodes along the logical path in accordance with an embodiment of the invention.

FIG. 12 is a schematic diagram illustrating ingress points for nodes along the logical path in accordance with an embodiment of the invention. The ingress points are depicted on the left side of the nodes. In the illustration, different vertical positions indicate different ingress points. The vertical positions shown in FIG. 12 are shown as varying to illustrate different ingress points at the various nodes. The double vertical lines on the input lines may be thought of as representing timeslots or channels that are used at the ingress port to carry signals for the logical connection of interest.

An object of the method 400 of FIG. 8 is to determine the ingress points as illustrated in FIG. 12. As stated above, the physical ingress points need to be determined because they will vary depending on the activation of protection schemes.

Figure 13A:
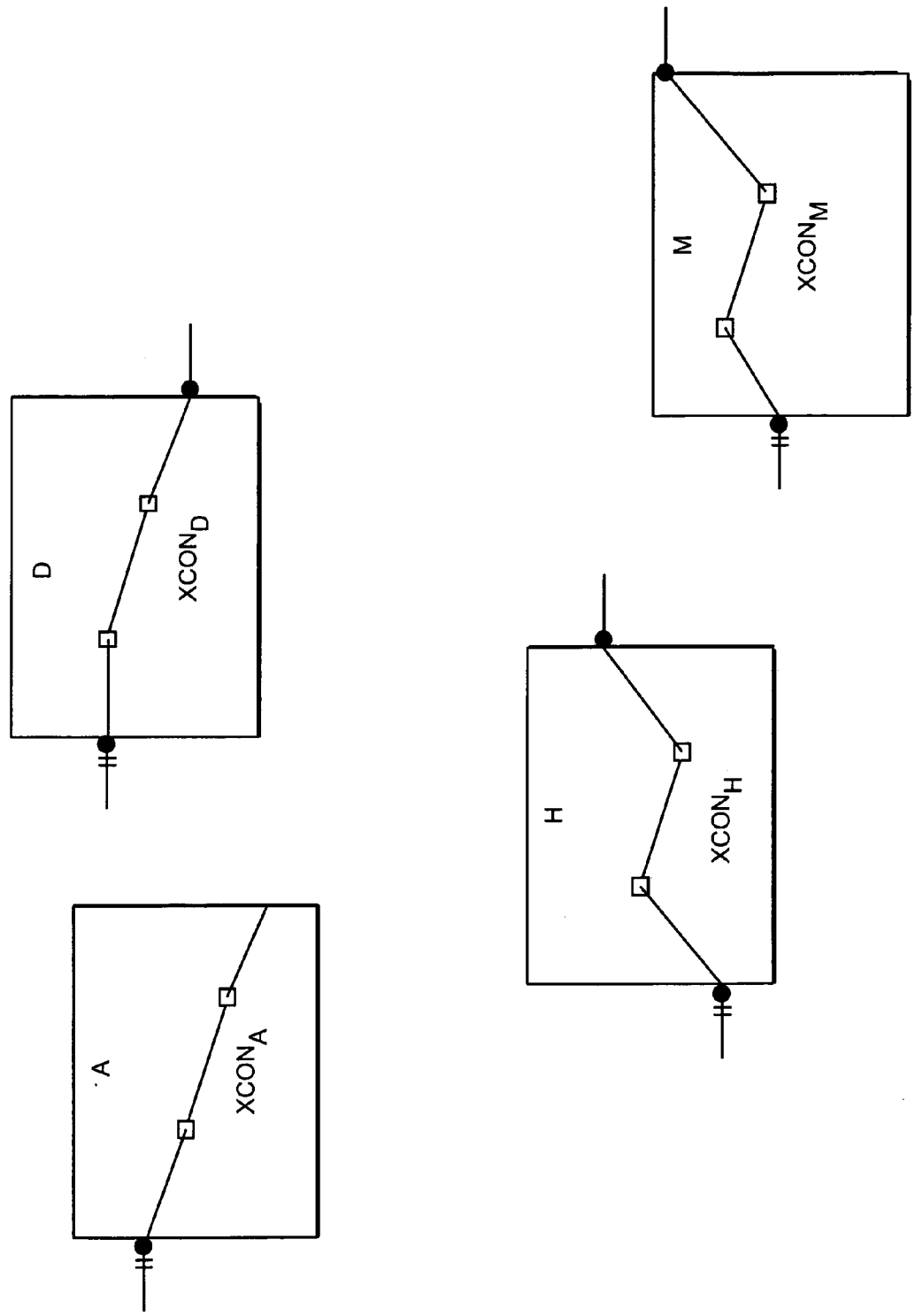
FIG. 13A is a schematic diagram illustrating ingress and egress points for nodes along the logical path in accordance with an embodiment of the invention.
Figure 13B:
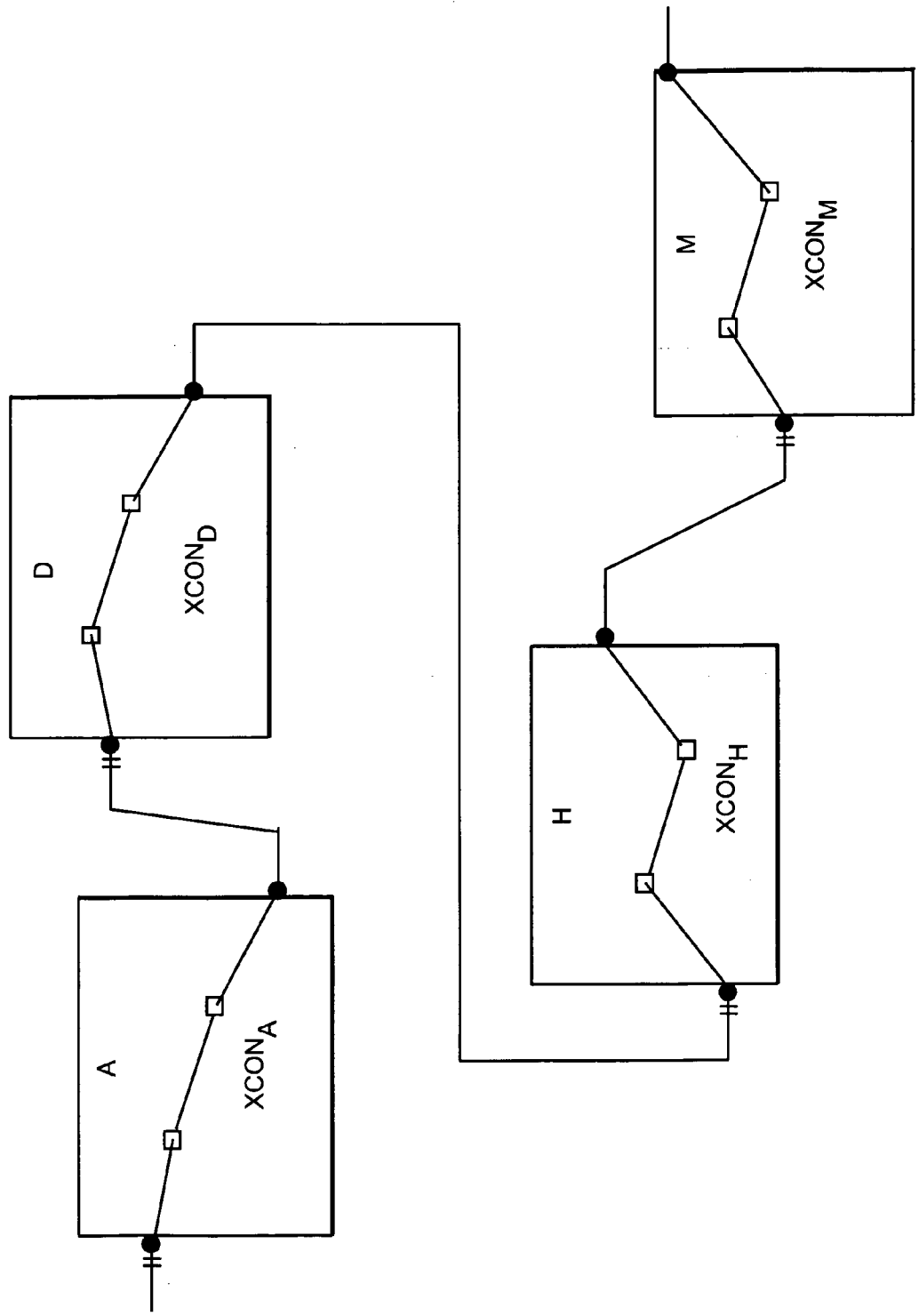
FIG. 13B illustrates the physical working route formed by connecting appropriate egress and ingress points in accordance with an embodiment of the invention.

FIG. 13A is a schematic diagram illustrating ingress and egress points for nodes along the logical path in accordance with an embodiment of the invention. The egress points are depicted on the right side of the nodes. In the illustration, different vertical positions on the right side indicate different egress points. The vertical positions on the right side shown in FIG. 13A are shown as varying to illustrate different egress points at the various nodes. No double vertical lines are shown on the output lines of FIG. 13A because the channels were already determined for the ingress points in the embodiment illustrated. In other embodiments, the egress channels may need to be determined. In addition, FIG. 13A depicts the cross connect between ingress and egress points by drawing a line between them.

An object of the method 500 of FIG. 9 is to determine the egress points as illustrated in FIG. 13A. As stated above, the physical egress points need to be determined because they will vary depending on the activation of protection schemes.

Once the ingress and egress points are determined as illustrated in FIG. 13A, the physical working route for the logical connection has basically been determined. The physical working route is obtained by simply connecting the appropriate egress and ingress points as illustrated in FIG. 13B in accordance with an embodiment of the invention.

Note that FIG. 13B is a simplification that would be accurate if there were no active protections, or if only linear span type protections were active. If ring type protections are active, then the physical working path calculated by an embodiment of the present invention would include loop-like diversions not illustrated in FIG. 13B.

Figure 13C:
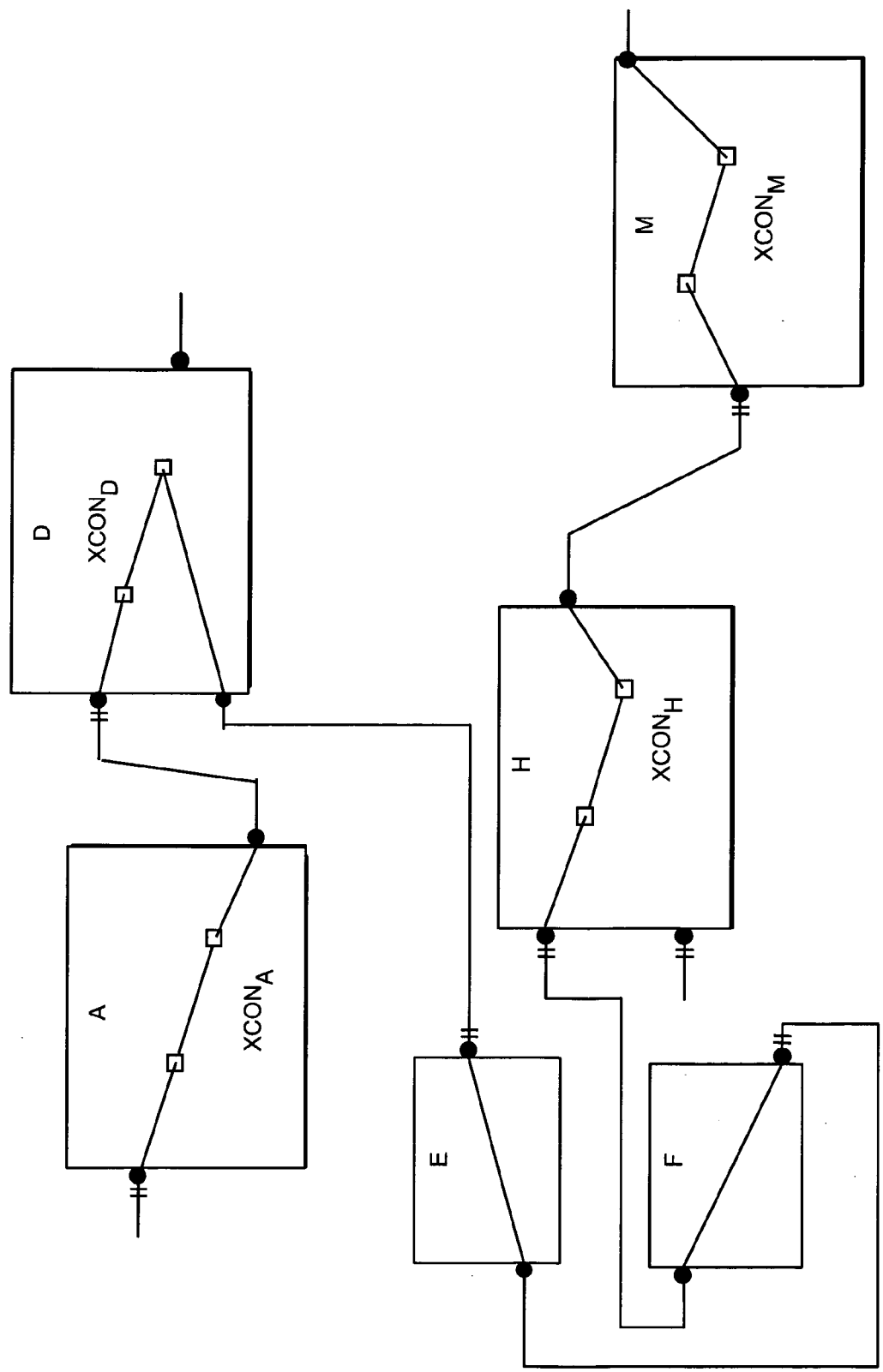
FIG. 13C illustrates a physical working route that includes a loop-like diversion due to activation of a ring type protection in accordance with an embodiment of the invention.

A simple example with a loop-like diversion due to activation of a ring protection is illustrated in FIG. 13C in accordance with an embodiment of the invention. In the example illustrated, the activated ring protection affects the egress point from node D. For example, the lines between node D and H may fail (for example, due to a cut in a cable between the two nodes) to cause a ring switch. Here the protect port acts as a new egress point. The physical working route is now re-routed to travel through ring nodes E and F, prior to traveling back into the ingress point of node H.

Figure 14:
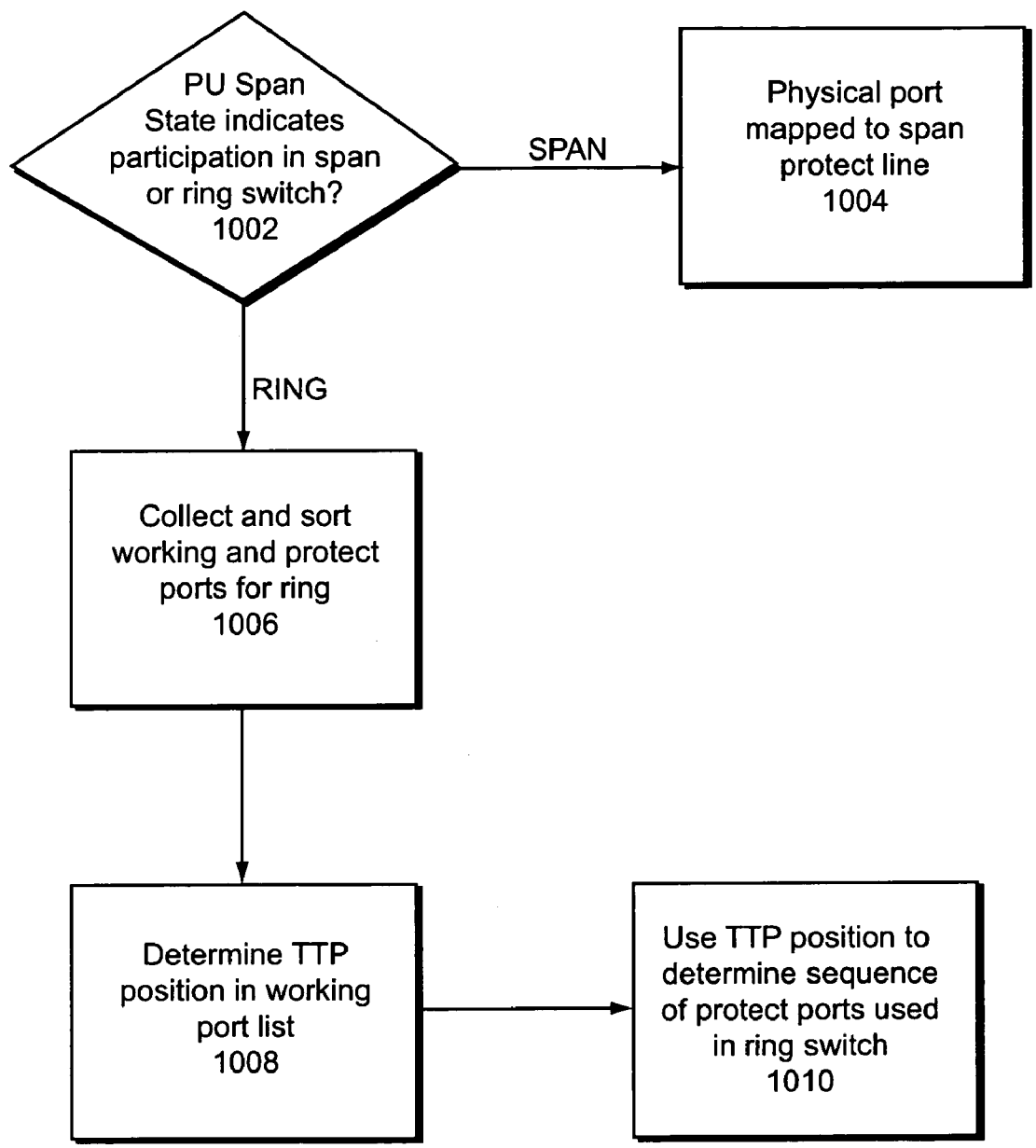
FIG. 14 is a flow chart depicting a method for analyzing a ring/span protection scheme in accordance with an embodiment of the invention.

FIG. 14 is a flow chart depicting a method for analyzing a ring/span protection scheme in accordance with an embodiment of the invention. The method may be applied, for example, as a step 1000 in calculating an egress point (see FIG. 9). The method 1000 as depicted includes five steps (1002, 1004, 1006, 1008, and 1010).

In accordance with a specific embodiment, it is confirmed prior to the method 1000 that the logical TTP is being actively protected by the ring/span protection scheme (see 514 in FIG. 9). Thereafter, in the first step 1002, the protect unit (PU) span state is examined to determine whether a span or ring switch is active.

If the span state indicates an active span switch, then the process 1000 goes to the second step 1004. In the second step 1004, the physical port is mapped to the span protect line. In the context of the method 500 of FIG. 9, this means that the egress point is mapped to the span protect line.

Otherwise, if the span state indicates an active ring switch, then the process 1000 goes to the third step 1006. In the third step 1006, working and protect ports for the ring are collected and sorted. Working and protect port lists may thus be created. The working and protect port lists may each comprise a linked lists of ports.

In the example illustrated in FIG. 3, the working port list for the outmost ring may comprise a linked list, such as iwAew; iwBew; iwCew; iwDew, where "iw" represents an ingress working port. "ew" represents an egress working port. "iwAew" represents an ingress working port for node A and the egress working port for node A. The linked list is cyclical in that the egress working port for node D links up to the ingress working port for node A. The connection illustrated in FIG. 3 has a working path going from the ingress working port of node A, to the egress working port of node A, to the ingress working port of node B, and finally to the egress working port of node B. Similarly, the protect port list for the innermost ring may comprise a linked list, such as epAip; epBip; epCip; epDip, where "ip" represents an ingress protect port, "ep" represents an egress protect port, "ipAep" represents an ingress protect port for node A and the egress protect port for node A. The linked list is cyclical in that the egress protect port for node D links up to the ingress protect port for node A.

In the fourth step 1008, the position of the logical TTP in the working port list is determined. In the example illustrated in FIG. 4, the working and protect lines between nodes A and B become severed. In that case, the egress working port of node A ("Aew") indicates participation in a ring switch (in step 1002) and so the TTP position for that port is determined in the working port list.

Finally, in the fifth step 1010, the TTP position in the working port list is used to determine the sequence of protect ports used in the ring switch. In one embodiment, the ring switch may go from the TTP position in the working port list to egress protect port on that node. In the example illustrated in FIG. 4, the ring switch would go from "Aew" (the working egress port of node A) to "epA" (the protect egress port of node A). Subsequently, the protect port list would be transversed in the opposite direction as the working port list was transversed. In our example, the working port list would be transversed from epA, to Dip, to epD, to Cip, to epC, to Bip. Thereafter, the physical route would switch back to the ingress working port on that node, i.e. to iwB. In this manner, the ring switch would reestablish the connection through the new physical route.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

List of Acronyms
SNC=subnetwork connection
DTL=designated transit list
XCON=cross-connect
CTP=connection termination point
GTP=group termination point TTP=trail termination point
PU=protect unit
PU=protect group
APS=Automatic Protection Switching
VLSR=Virtual Line Switched Ring

What is claimed is:

1. A method for calculating a physical route for a currently established connection in a communication network comprising a plurality of nodes, each of the plurality of nodes having a plurality of ingress points and a plurality of egress points, the method comprising:
   retrieving information regarding the plurality of nodes from at least one of the plurality of nodes along a logical path for the connection;
   calculating which one of said plurality of ingress points is connected in the physical route of said connection for each of the plurality of nodes along the logical path; and
   calculating which one of said plurality of an egress points is connected in the physical route of said connection for each of the plurality of nodes along the logical path, wherein the calculating of the ingress point includes determining activation of protection schemes for the ingress point and returning a logical port as the ingress point if no protection scheme is activated.

2. The method of claim 1 further comprising retrieving the logical path for the connection.

3. The method of claim 2 wherein retrieving the logical path comprises retrieving the logical path for the connection from an originating node of the plurality of nodes.

4. The method of claim 3 further comprising retrieving a cross-connect identifier for use in. locating cross-connect data sets associated with the connection.

5. The method of claim 1 further comprising retrieving cross-connect data sets for the connection from at least one of the plurality of nodes along the logical path.

6. The method of claim 1 wherein calculating the ingress for a one of said plurality of nodes point further comprises mapping the ingress point onto a port of a protect line if a span protection is activated.

7. The method of claim 6 wherein the span protection is part of a ring/span protection scheme.

8. The method of claim 6 wherein the span protection comprises span-only protection.

9. The method of claim 1 wherein calculating the egress point for a one of said plurality of nodes comprises determining activation of protection schemes for the egress point.

10. The method of claim 9 wherein calculating the egress point for a one of said plurality of nodes further comprises returning a logical port as the egress point if no protection scheme is activated.

11. The method of claim 10 wherein calculating the egress point for a one of said plurality of nodes further comprises mapping the egress point onto a port of a protect line if a span protection is activated.

12. The method of claim 11 wherein calculating the egress point for a one of said plurality of nodes further comprises analyzing a ring/span protection if the ring/span protection is activated.

13. The method of claim 12 wherein calculating the egress point for a one of said plurality of nodes further comprises determining whether a span protection or a ring protection is activated.

14. The method of claim 13, wherein calculating the egress point for a one of said plurality of nodes further comprises collecting and sorting ports for the ring protection if the ring protection is activated.

15. The method of claim 14, wherein calculating the egress point for a one of said plurality of nodes further comprises determining a sequence of protect ports used in a ring switch.

16. A system for calculating a physical route for an established connection in a communication network comprising a plurality of nodes, each of the plurality of nodes having a plurality of ingress points and a plurality of egress points, the system comprising:
   a logical path finder to determine the logical path for an established connection;
   a communication channel to access each of the plurality of nodes along a logical path for the connection; and
   a physical route calculator to calculate which one of said plurality of ingress points for each of a plurality of nodes is currently connected along the logical path and calculating which one of said egress points is currently connected for each of a plurality of nodes along the logical path,
   said physical route calculator determining activation of protection schemes for the one ingress point and returning a logical port as the ingress point if no protection scheme is activated.

17. The system of claim 16, further comprising a coupling module to couple the appropriate egress points and ingress points to form the physical route.

18. The system of claim 16, wherein cross-connect data sets for the connection are to retrieve using the communication channel from at least one of the plurality of nodes along the logical path.

19. A system for calculating a physical route for a connection in an communication network comprising a plurality of nodes, at least some of the plurality of nodes having a plurality of ingress points and a plurality of egress points, the system comprising:
   means for accessing each of the plurality of nodes along a logical path for the connection;
   means for calculating which one of said plurality of ingress points is connected along said physical route for at least some of the plurality of nodes along the logical path, determining activation of protection schemes for the one ingress point, and returning a logical port as the ingress point if no protection scheme is activated; and
   means for calculating which one of said plurality of egress points is connected along said physical route for at least some of the plurality of nodes along the logical path.

* * * * *